(12) United States Patent  (10) Patent No.: US 12,423,214 B2
Pandurangarao  (45) Date of Patent: *Sep. 23, 2025

(54) METHODS AND SYSTEMS FOR AN INTELLIGENT TECHNICAL DEBT HELPER BOT

(71) Applicant: Allstate Insurance Company, Northbrook, IL (US)

(72) Inventor: Anil Kumar Pandurangarao, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,770

(22) Filed: Mar. 28, 2024

(65) Prior Publication Data

US 2025/0061043 A1  Feb. 20, 2025

Related U.S. Application Data

(63) Continuation of application No. 17/348,077, filed on Jun. 15, 2021, now Pat. No. 11,971,804.

(51) Int. Cl.
*G06F 8/33* (2018.01)
*G06F 11/3604* (2025.01)
*G06N 3/08* (2023.01)
G06F 9/451 (2018.01)
G06F 11/07 (2006.01)
G06F 11/3698 (2025.01)
G06F 40/186 (2020.01)
G06N 3/045 (2023.01)
G06Q 10/06 (2023.01)
G06Q 10/0639 (2023.01)
G06Q 10/101 (2023.01)
G06Q 20/04 (2012.01)

(52) U.S. Cl.
CPC ............ *G06F 11/3608* (2013.01); *G06F 8/33* (2013.01); *G06N 3/08* (2013.01); *G06F 9/454* (2018.02); *G06F 11/0793* (2013.01); *G06F 11/3698* (2025.01); *G06F 40/186* (2020.01); *G06N 3/045* (2023.01); *G06Q 10/06* (2013.01); *G06Q 10/06393* (2013.01); *G06Q 10/101* (2013.01); *G06Q 20/0425* (2013.01)

(58) Field of Classification Search
CPC .......... G06F 8/33; G06F 9/454; G06F 40/186; G06F 11/3608; G06F 11/3664; G06N 3/08; G06N 3/045; G06Q 10/101; G06Q 10/06393; G06Q 10/06; G06Q 20/0425

See application file for complete search history.

*Primary Examiner* — Tuan A Vu
(74) *Attorney, Agent, or Firm* — Dinsmore & Shohl LLP (57) ABSTRACT

Methods and systems for an intelligent technical debt helper may include receiving, via a processor, a level of technical debt associated with a technical debt of a computer program code and determining, via the processor, whether the level of technical debt is greater than a technical debt threshold. The method may also include generating, using an artificial intelligence neural network model communicatively coupled to the processor and based on the computer program code, an automated code recommendation to address the technical debt of the computer program code when the level of technical debt is greater than the technical debt threshold.

20 Claims, 4 Drawing Sheets

METHODS AND SYSTEMS FOR AN INTELLIGENT TECHNICAL DEBT HELPER BOT

CROSS-REFERENCE TO RELATED APPLICATIONS

This application is a continuation of and claims priority to co-pending U.S. application Ser. No. 17/348,077 filed Jun. 15, 2021, which is incorporated by reference in its entirety herein.

TECHNICAL FIELD

The present disclosure relates to systems and methods for an intelligent technical debt helper bot, particularly to systems and methods for an intelligent technical debt helper bot to utilize an artificial intelligence neural network model to generate an automated code recommendation to address the technical debt above a threshold.

BACKGROUND

In the course of software development, a codebase may incur technical debt. Such technical debt may be indicative of an implied cost of additional work in software development due to, for example, a developer implementing quick, short-term solutions to issues in the codebase rather than solutions that are more effective in the long term. If technical debt is not properly addressed, the level of technical debt in the codebase may compound upon further development of the codebase, resulting in an increased amount of additional work and cost to resolve the issues.

However, tasking a developer with tracking and addressing technical debt can slow the software development cycle, and the developer may miss addressing technical debt awaiting resolution. Further, if the developer does not properly address the technical debt, more technical debt may accrue. Therefore, a need exists for methods and systems to effectively reduce or eliminate technical debt.

BRIEF SUMMARY

According to the subject matter of the present disclosure, an intelligent technical debt helper bot system may include an artificial intelligence neural network model, one or more processors, one or more memory components communicatively coupled to the one or more processors and the artificial intelligence neural network model, and machine-readable instructions stored in the one or more memory components. The machine-readable instructions may cause the one or more processors to receive a level of technical debt associated with a technical debt of a computer program code and determine whether the level of technical debt is greater than a technical debt threshold. The machine-readable instructions may also cause the one or more processors to generate, using the artificial intelligence neural network model and based on the computer program code, an automated code recommendation to address the technical debt of the computer program code when the level of technical debt is greater than the technical debt threshold.

In accordance with one embodiment of the present disclosure, an intelligent technical debt helper bot system may include an artificial intelligence neural network model, one or more processors, one or more memory components communicatively coupled to the one or more processors and the artificial intelligence neural network model, and machine-readable instructions stored in the one or more memory components. The machine-readable instructions may cause the one or more processors to perform receive a level of technical debt associated with a technical debt of a computer program code and determine whether the level of technical debt is greater than a technical debt threshold. The machine-readable instructions may also cause the one or more processors to generate, using the artificial intelligence neural network model and based on the computer program code, an automated code recommendation to address the technical debt of the computer program code when the level of technical debt is greater than the technical debt threshold, wherein the automated code recommendation comprises one or more recommendations to re-arrange the computer program code, add to the computer program code, remove from the computer program code, or combinations thereof to reduce the level of technical debt, eliminate the technical debt, or combinations thereof. The machine-readable instructions may further cause the one or more processors to train the artificial intelligence neural network model using machine learning based on the automated code recommendation, acceptance or rejection of the automated code recommendation, or combinations thereof.

In accordance with another embodiment of the present disclosure, an intelligent technical debt helper method may include receiving, via a processor, a level of technical debt associated with a technical debt of a computer program code and determining, via the processor, whether the level of technical debt is greater than a technical debt threshold. The method may also include generating, using an artificial intelligence neural network model communicatively coupled to the processor and based on the computer program code, an automated code recommendation to address the technical debt of the computer program code when the level of technical debt is greater than the technical debt threshold.

Although the concepts of the present disclosure are described herein with primary reference to technical debt, it is contemplated that the concepts will enjoy applicability to any software development tracking and resolution platforms. For example, and not by way of limitation, it is contemplated that the concepts of the present disclosure will enjoy applicability to coding and codebase development platforms.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Embodiments of the present disclosure are directed to generating automated code recommendations to address the technical debt of computer program code when the level of technical debt is greater than the technical debt threshold. Systems and methods are described for an intelligent technical debt helper bot to utilize an artificial intelligence (AI) neural network model to generate an automated code recommendation to address the technical debt above the technical debt threshold. In embodiments described herein, the intelligent technical debt helper bot may be AI-driven and configured to rectify and/or reduce technical debt by running, modifying, adding and/or removing lines of code of a codebase.

Technical debt, as used herein, may reference an implied cost of additional work to develop a section of a codebase including a computer program code. For example, such technical debt may accrue due to a software developer implementing short-term solutions to issues in a codebase rather than solutions that are more effective in the long term. Short-term solutions may be implemented due to time constraints in the development cycle because short-term solutions are simpler and faster to implement. If technical debt is not properly addressed, the level of technical debt in the codebase may compound upon further development of the codebase, resulting in an increased amount of additional work and associated cost to resolve the issues. In embodiments, technical debt may be measured in terms of approximate time required to resolve issues in the codebase, which may be any period of time measured in, for example, minutes, hours, and/or days.

Computer program code, as used herein, refers to machine-readable instructions that may be stored in memory and may be executed by a processor in any type of computer programming language, as discussed in more detail below with respect to FIG. 2. A discrete collection of computer program code used to build software systems, applications, or components may also be called a codebase. A centralized location for managing and maintaining a codebase may be referred to as a code repository.

An artificial intelligence neural network model, as used herein, may refer to artificial neural networks, also simply called neural networks. Neural networks comprise layers of nodes, typically comprising at least an input layer, one or more hidden layers, and an output layer. A neural network may be trained by providing the neural network with a set of training data to modify the values of its hidden layers such that the neural network learns to perform tasks by considering examples without being programmed with task-specific rules. Successive analyses of additional training data may cause the neural network to become increasingly accurate. Neural networks will be described in greater detail below with respect to FIG. 2.

An integrated development environment (IDE), as used herein, refers to software applications that are utilized by software developers for software development. The complexity of the IDE may range from a simple text editor to software applications comprising a text editor, build automation tools, version control, debuggers, among other software development tools. The IDE may include a command line interface and/or a graphical user interface (GUI).

Figure 1:
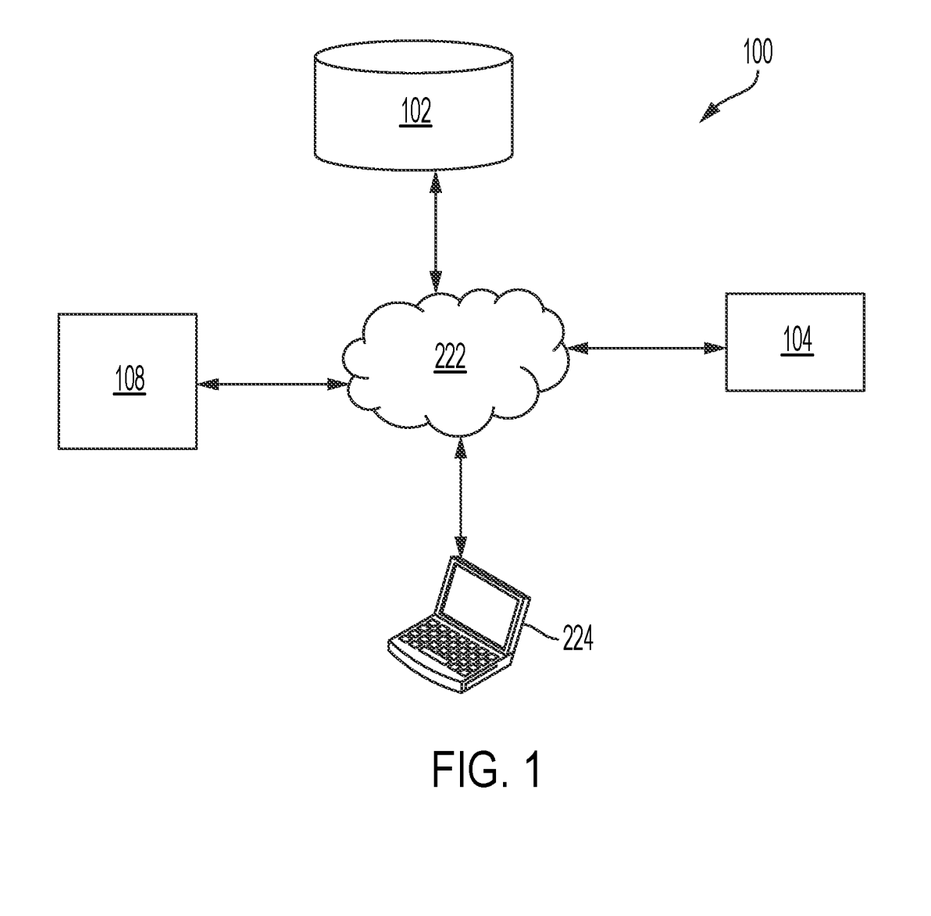
FIG. 1 schematically depicts a technical debt helper bot sub-system including a technical debt helper bot, according to one or more embodiments shown and described herein.
Figure 2:
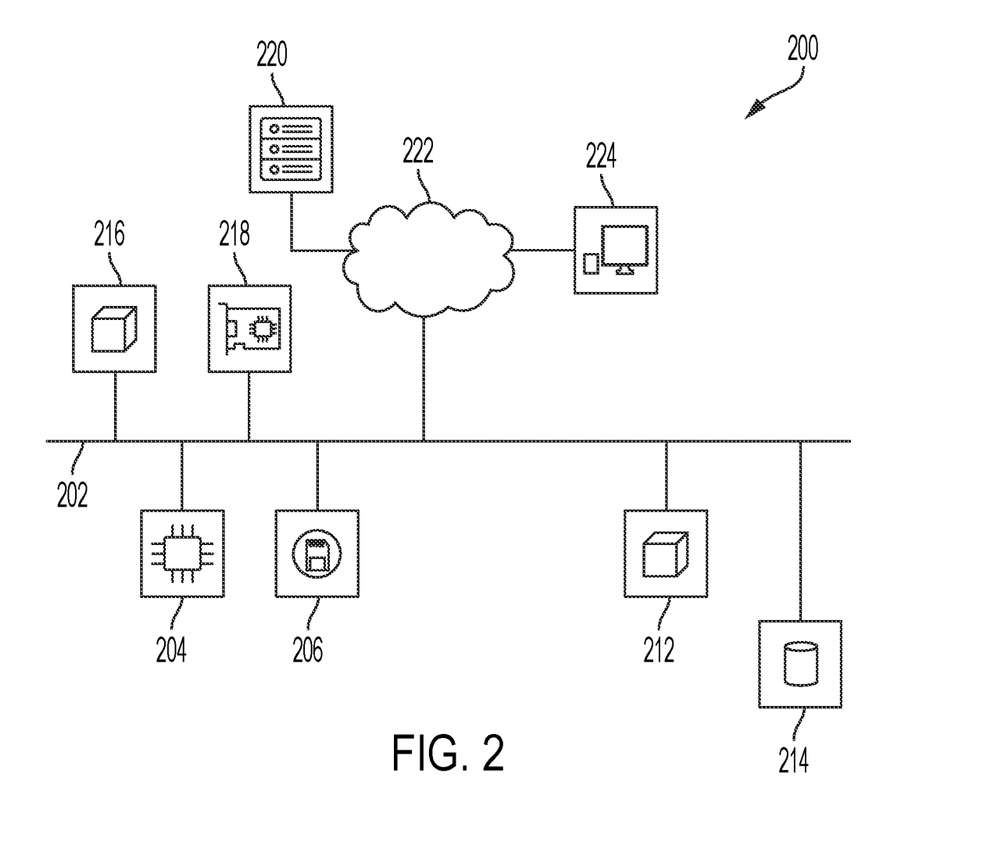
FIG. 2 schematically depicts a computer implemented system for use with the processes described herein and the technical debt helper bot sub-system solution of FIG. 1, according to one or more embodiments shown and described herein.

To generate automated code recommendations, embodiments may use a code analysis tool to analyze the codebase and determine the level of technical debt that exists in the codebase, as illustrated in FIG. 1 and FIG. 2. For example, a code repository 102 may be communicatively coupled to a code analysis tool to analyze the codebase contained therein. When the level of technical debt of the codebase reaches a predetermined level as a technical debt threshold, the technical debt helper bot (TDHB) 104 may analyze the codebase to generate automated code recommendations via the artificial intelligence (AI) neural network model 108, as set forth in a process 300 of FIG. 3 that is described in greater detail further below. The automated code recommendations may be implemented automatically or may be provided to a developer for the developer to review and approve as shown in FIG. 4, also described in greater detail further below. Accordingly, disclosed herein are methods and systems for a technical debt helper bot.

Referring again to FIG. 1, a sub-system 100 for a technical debt helper bot is shown, which may be a distributed system. The sub-system 100 includes the code repository 102, the TDHB 104, the AI neural network model 108, a computing device 224, and a network 222. Each component of the sub-system 100 of FIG. 1 may be communicatively coupled to each other via network 222. In FIG. 1, only a single code repository 102, TDHB 104, computing device 224, and AI neural network model 108 are shown; however, it should be understood and is contemplated by this disclosure that any number of code repositories 102, TDHBs 104, computing devices 224, and AI neural network models 108 may be included. It should also be understood that the code repository 102, TDHB 104, computing device 224, and AI neural network model 108 may exist as separate devices, as depicted in FIG. 1, or as one or more devices comprising a combination of the code repository 102, TDHB 104, computing device 224, and AI neural network model 108. The sub-system 100 may be used to carry out the methods and processes in environments as described herein.

The code repository 102 including a codebase may be communicatively coupled to a computing device 224 to host the code repository 102 and the codebase. The code repository 102 may be a centralized location where the codebase for a software application is stored, as well as the metadata for the codebase necessary for maintaining a version control system comprising a historical record of changes to the codebase, such as a set of "commits" (i.e., modifications) to the codebase. The code repository 102 may also be communicatively coupled to code analysis tools used to analyze the codebase. The code analysis tools may be set to run upon predetermined actions or thresholds. For example, a code analysis tool may be set to run upon a commit, such that analysis is run before a developer "pushes" (i.e., uploads) any changes to the codebase through the commit.

The TDHB 104 may also or instead be communicatively coupled to the code analysis tools to analyze the codebase. The TDHB 104 may be communicatively coupled to the code repository 102 via the network 222. The TDHB 104 may exist as a program within the code repository 102 or as a separate computing device 224. The TDHB 104 may generate automated code recommendations for reducing or eliminating technical debt of at least a portion of the codebase analyzed as described herein. When the code analysis tools analyze the codebase in the code repository 102, the code repository 102 may update a variable indicating the level of technical debt associated with the codebase (or the least one portion analyzed). If the TDHB determines that the level of technical debt reaches a predetermined threshold set as a technical debt threshold in the TDHB 104, the TDHB 104 may generate automated code recommendations for the associated codebase analyzed in the code repository 102 to reduce or eliminate the associated level of technical debt.

The AI neural network model 108 may be communicatively coupled to the code repository 102 and the TDHB 104 via network 222. The AI neural network model 108 may be utilized by the TDHB 104 to generate the automated code recommendations. The AI neural network model 108 may be trained on a set of predetermined coding rules, a set of computer program code that comprises zero technical debt, and/or historical technical debt data to assist in the generation of automated code corrections that reduce or eliminate technical debt. The AI neural network model 108 may improve the accuracy of the automated code recommendations by learning from historical technical debt data, such as changes to similar coding patterns by the user, as well as user feedback, such as acceptance or rejection by the user regarding previous automated code recommendations, to provide more accurate automated code recommendations.

The computing device 224 of FIG. 1 may be utilized by a developer for software development. The computing device 224 may be communicatively coupled to the code repository 102, the TDHB 104, and the AI neural network model 108 via network 222. The computing device 224 may "fetch" (i.e., download) a codebase from the code repository 102 to save locally to the computing device 224 and to make modifications to the codebase on the now local copy of the codebase. The computing device 224 may contain a user's modifications to the local copy of the codebase. Before the user's modifications to the local copy of the codebase are pushed to the code repository 102, the TDHB 104 may analyze the user's modifications when the user's modifications generate technical debt that would cause the technical debt of the codebase to be over a predetermined threshold level of technical debt. Additionally or alternatively, the TDHB 104 may analyze the codebase after the user's modifications to the local copy of the codebase are pushed to the code repository 102. In either scenario, the TDHB 104 may generate automated coding changes to reduce or eliminate technical debt as described herein.

Referring now to FIG. 2, a system 200 for a TDHB 104 is schematically depicted. The system 200 may be a server-based system including system 200, a communication path 202, a processor 204, a memory component 206, a TDHB module 212, a data storage component 214, an AI neural network module 216, a network connectivity component 218, a server 220, the network 222, and one or more computing devices 224 (such as the computing device 224 of FIG. 1). The system 200 is communicatively coupled to the sub-system 100 of FIG. 1 via the network 222 and may be used to carry out the methods and processes as described herein. The TDHB 104 of FIG. 1 may be communicatively coupled to and operable by the TDHB module 212 of FIG. 2, and the AI neural network model 108 of FIG. 1 may be communicatively coupled to and operable by AI neural network module 216.

The communication path 202 of the system 200 may be formed from any medium that is capable of transmitting a signal such as, for example, conductive wires, conductive traces, optical waveguides, and the like, or from a combination of mediums capable of transmitting signals. The communication path 202 communicatively couples the various components of system 200. As used herein, the term "communicatively coupled" means that coupled components are capable of exchanging data signals with one another such as, for example, electrical signals via a conductive medium, electromagnetic signals via air, optical signals via optical waveguides, and the like.

The processor 204 can be any device capable of executing machine-readable instructions. Accordingly, the processor 204 may be a controller, an integrated circuit, a microchip, a computer, or any other computing device. The processor 204 is communicatively coupled to the other components of the system 200 by the communication path 202. Accordingly, the communication path 202 may communicatively couple any number of processors with one another, and allow the modules and components coupled to the communication path 202 to operate in a distributed computing environment. Specifically, each of the components can operate as a node that may send and/or receive data.

The memory component 206 may be a non-transitory computer readable medium or non-transitory computer readable memory and may be configured as a non-volatile computer readable medium. The memory component 206 is communicatively coupled to the other components of the system 200 by the communication path 202. The memory component 206 may comprise RAM, ROM, flash memories, hard drives, or any other device capable of storing machine-readable instructions such that the machine-readable instructions can be accessed and executed by the processor 204. The machine-readable instructions may comprise logic or algorithms written in any programming language such as, for example, machine language that may be directly executed by the processor, or assembly languages, object-oriented programming (OOP) languages, scripting languages, microcode, and the like, that may be compiled or assembled into machine-readable instructions and stored on the memory component 206. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The data storage component 214 is coupled to the communication path 202 and may contain one or more persistent storage devices such as solid state drives, hard disk drives, or any other device capable of persistent data storage. The code repository 102 of FIG. 1 may be one of one or more data storage components 214. The data storage component 214 may store data used by various components of the system 200. In addition, the data storage component 214 may store data downloaded and/or received from the remote computing device 224. It should be understood that the data storage component 214 may reside local to and/or remote from the server 220 and may be configured to store one or more pieces of data for access by the server 220 and/or other components of the system 200. The data storage component 214 may include computer program code such as source code, automated code recommendations, and other electronic data documents. Other data to perform the functionalities described herein may also be stored in the data storage component 214 (e.g., cached data, user session data, historical automated code recommendation data, etc.).

The AI neural network module 216 is communicatively coupled via the communication path 202 to the processor 204 and components of the system 200. The AI neural network module 216 may train and provide machine learning capabilities to a neural network such as the AI neural network model 108 as described herein. By way of example, and not as a limitation, a convolutional neural network (CNN) may be utilized as the AI neural network model 108. The AI neural network module 216 may receive a set of predetermined coding rules, a set of computer program code that comprises zero technical debt, historical technical debt data, or combinations thereof for training. The AI neural network module 216 may receive source code having technical debt as input and generate automated code recommendations as output that reduces or eliminates technical debt.

Data stored and manipulated in the system 200 as described herein is utilized by the AI neural network module 216, which is able to leverage a cloud computing-based network configuration such as the cloud to apply machine learning and artificial intelligence. This machine learning application may create models that can be applied by the system 200, to make it more efficient and intelligent in execution. As an example and not a limitation, the AI neural network module 216 may include artificial intelligence components selected from the group consisting of an artificial intelligence engine, Bayesian inference engine, and a decision-making engine, and may have an adaptive learning engine further comprising a deep neural network learning engine.

The TDHB module 212 may be communicatively coupled to the TDHB 104 of FIG. 1 and the communication path 202 and may contain logic or algorithms necessary to analyze a codebase and generate automated code recommendations as described herein. The TDHB module 212 may analyze a codebase by receiving the codebase from the code repository 102, from a remote computing device 224, or from a local copy of the codebase stored on the data storage component 214. The TDHB module 212 may provide automated code recommendations based on a set of predetermined coding rules, a set of computer program code that comprises zero technical debt, historical technical debt data, or combinations thereof. The TDHB module 212 may work with or incorporate the AI neural network module 216 to generate automated code recommendations that are more effective at reducing technical debt upon subsequent generations of automated code recommendations. The improvements may be based on a set of automated feedback that further trains AI neural network model 108 of FIG. 1 via the AI neural network module 216 and machine learning. Such automated feedback may be in the form of the reduction in the level of technical debt in the code repository 102 and/or the acceptance/rejection of automated code recommendations by the user. The automated code recommendations may comprise one or more recommendations to re-arrange the computer program code, add to the computer program code, remove from the computer program code, or combinations thereof to reduce and/or eliminate technical debt in the codebase.

The communication path 202 communicatively couples the network connectivity component 218 to other components of the system 200. The network connectivity component 218 can be any device capable of transmitting and/or receiving data via a wireless network. Accordingly, the network connectivity component 218 can comprise a communication transceiver for sending and/or receiving data according to any wireless communication standard. For example, the network connectivity component 218 can comprise a chipset (e.g., antenna, processors, machine-readable instructions, etc.) to communicate over wired and/or wireless computer networks such as, for example, Wi-Fi, WiMax, Bluetooth, IrDA, Ethernet, Z-Wave, ZigBee, and the like.

The network 222 may comprise any wired and/or wireless network such as, for example, wide area networks, metropolitan area networks, local area networks, satellite networks, and the like. Accordingly, the network 222 can be utilized as an access point by the computing device 224 to access one or more servers (e.g., a server 220). The server 220 and any additional servers generally comprise processors, memory, and chipset for delivering resources via the network 222. Resources can include providing, for example, processing, storage, software, and information from the server 220 to the system 200 via the network 222. Additionally, it is noted that the server 220 and any additional servers can share resources with one another over the network 222 such as, for example, via the wired portion of the network, the wireless portion of the network, or combinations thereof.

The computing device 224 may be any device having hardware (e.g., chipsets, processors, memory, etc.) for modifying computer programming code by a software developer. The computing device 224 may be remote from other components of the system 200 and thus may comprise an antenna, cable, or other network hardware for communicating over the network 222. The data from various applications running on computing device 224 can be provided from the computing device 224 to other components of the system 200 via the network connectivity component 218.

Figure 3:
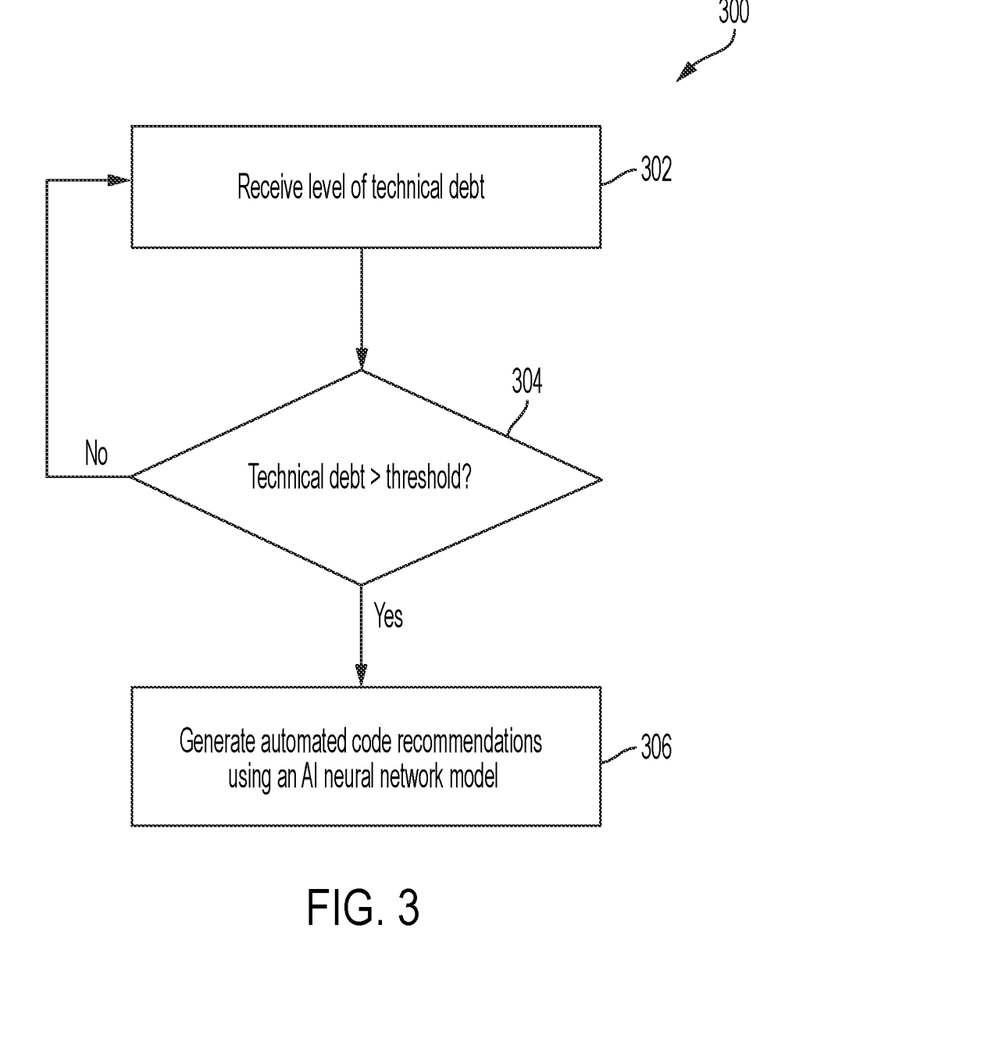
FIG. 3 depicts a process for use with the technical debt helper bot sub-system of FIG. 1 and the computer implemented system of FIG. 2, according to one or more embodiments shown and described herein.
Figure 4:
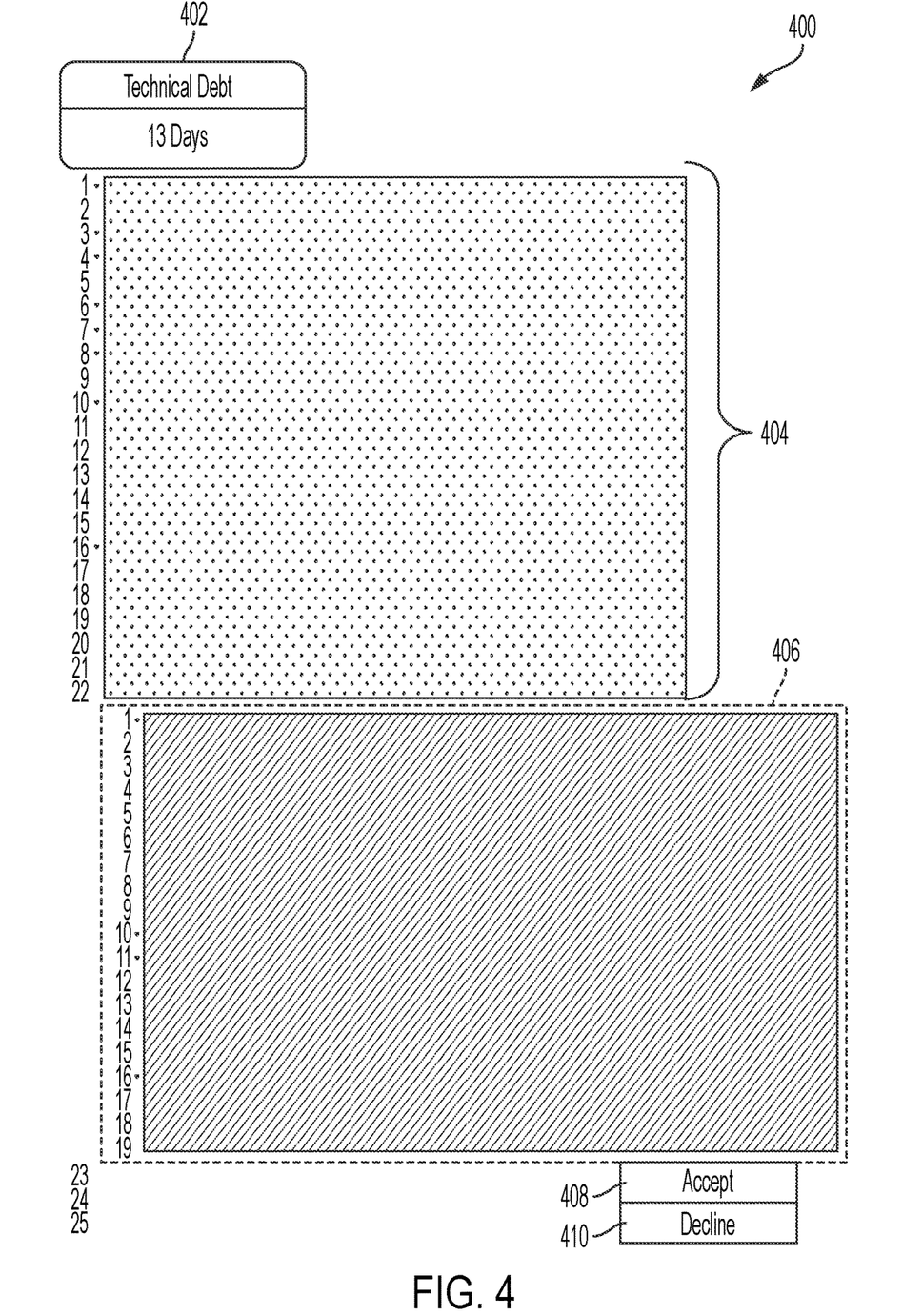
FIG. 4 depicts an integrated development environment with automated code recommendations generated by the technical debt helper bot of FIG. 1, the computer implemented system of FIG. 2, and the process of FIG. 3, according to one or more embodiments shown and described herein.

FIG. 3 sets forth the process 300 for the TDHB 104 to generate automated code recommendations as described herein by use of the sub-system 100 and system 200 of FIGS. 1-2. At block 302, a level of technical debt is received, such as from a code analyzer tool as described herein. The level of technical debt for a codebase of the code repository 102 may be determined by the code analyzer tool via an analysis of the codebase. The analysis of the codebase may determine which portions of the codebase may need to be refactored or otherwise modified to optimize the codebase based on one or metrics that may define technical debt, such as efficiency, readability, maintainability, and/or other technical debt related metrics. Categories of issues that may incur technical debt include refactoring and design violations (e.g., syntax rules, linting rules, and improper bloaters), operator violations, complexity violations (e.g., multiple if-else statements and nested loops), single-line statements, and other potential code smells.

The level of technical debt for one or more portions of the codebase may be measured in an amount of time that would be estimated to eliminate the technical debt of the codebase. For example, a patch to a bug may have been implemented on day 1 such that the patch incurred only 15 minutes of technical debt; however, on day 15, other features may have been built based off of the patch such that the technical debt has compounded to 2 hours of technical debt, despite the new features incurring no new technical debt. The TDHB 104 may receive the level of technical debt of the codebase from the code analyzer tool to compare to a technical debt threshold to determine whether automated code recommendations should be generated.

At block 304, the TDHB 104 determines whether automated code recommendations should be generated by comparing the level of technical debt of the codebase to such a predetermined technical debt threshold. The technical debt threshold may be set within the TDHB 104 by an administrator or manager of the code repository 102, for example, and may be adjusted as necessary. If the level of technical debt is not greater than the technical debt threshold, then the process 300 returns to block 302. If the level of technical debt is greater than the technical debt threshold, then the process 300 moves to block 306.

At block 306, the TDHB 104 generates automated code recommendations. The TDHB 104 may generate automated code recommendations based on predetermined coding rules. The TDHB 104 may also generate automated code recommendations using the AI neural network model 108 of FIG. 1. The AI neural network model 108 may be trained on a set of predetermined coding rules, a set of computer program code having zero technical debt, historical technical debt data, or combinations thereof. The AI neural network model 108 may receive computer program code as inputs, which may be stored in the code repository 102 or on a user computing device 224. The AI neural network model 108 may generate as outputs a set of automated code recommendations to address the technical debt of the input computer program code. The automated code recommendations may comprise one or more recommendations to re-arrange the computer program code, add to the computer program code, remove from the computer program code, or combinations thereof to reduce or eliminate the level of technical debt.

Referring now to FIG. 4, an integrated development environment (IDE) with automated code recommendations generated by the technical debt helper bot is depicted. A user's development environment may be an IDE 400, for example. The IDE 400 may comprise a graphical user interface (GUI). The GUI may display via a technical debt display 402 the level of technical debt in the codebase. For example, the technical debt shown in the technical debt display 402 may be measured in terms of days. The GUI may display other metrics as well as other interactive elements.

The IDE 400 may present a single program in which all development may be done. The IDE 400 may have multiple integrated components, such as syntax highlighters, version controllers, debuggers, and other components to maximize user productivity in a single development environment. The TDHB 104 may be implemented as an integrated component of the IDE 400. For example, instead of having to load or otherwise invoke the TDHB 104 as a separate program, the TDHB 104 may be loaded within the IDE 400. This may allow the TDHB 104 to run as the user is developing software. It should be understood that the TDHB 104 is not limited to use in IDEs but may also be implemented as a separate program, a plug-in, an external service, or some other environment for running a software application.

The TDHB 104 may generate a notice to a user that the automated code recommendation generated by the TDHB 104 should be used to reduce the level of technical debt in a code snippet within a developer code area 404. The notice may be in the form of a recommended code snippet in an automated code recommendation area 406 demonstrating the appearance of the code snippet within the developer code area 404 after the automated code recommendation is applied. The automated code recommendations may be automated in the sense that each recommendation contains instructions to re-arrange the computer program code (such as the code snippet within the developer code area 404), add to the computer program code, remove from the computer program code, or combinations thereof that may automatically change the computer program code upon application of the automated code recommendation.

It is contemplated by this disclosure and should be understood that if the IDE 400 is not used, a user may still receive a notice of an automated code recommendation. For example, if a user uses a command line interface as part of the user's software development workflow, the command line interface may show the code snippet within the developer code area 404 having technical debt and the recommended code snippet within the automated code recommendation area 406 based on the implemented automated code recommendation, or the command line interface may display a more general notice that an automated code recommendation is available.

The automated code recommendation generated by the TDHB 104 may be applied to the computer program code manually or automatically. The automated code corrections may be applied at any stage of the development process. For example, the automated code corrections may be applied at the pre-commit stage in the IDE 400, such that the automated code corrections may be applied before any of the affected files are committed and the developer may view the affected files. As another example, the automated code corrections may be applied at the push stage on the repository. If pushing a new commit introduces an amount of technical debt for an associated codebase that exceeds the technical debt threshold, the TDHB 104 may run on and analyze the codebase within the code repository 102, generate automated code recommendations for the codebase, and automatically apply the automated code recommendations to the codebase.

If the TDHB 104 is not instructed to apply the automated code recommendations automatically, the IDE 400 may display a prompt for approval by the user on the GUI to accept or decline the application of the automated code recommendation. Accepting the application of the automated code recommendation may be performed by clicking an accept button 408 on the GUI. Declining the application of the automated code recommendation may be performed by clicking a decline button 410 on the GUI. The prompt may be for the automated code recommendation as a whole, combinations of automated code recommendations, and/or individual components of particular automated code recommendations. Accepting or declining the application of an automated code recommendation is not limited to buttons 408, 410 shown but may also include swipes, voice commands, keyboard shortcuts, and other interactions. If an IDE 400 is not used, a developer may still be prompted to accept or decline the application of an automated code recommendation. For example, if a user uses a command line interface as part of the user's software development workflow, the command line interface may prompt a user to accept or decline the implementation of an automated code correction and solicit a response from the user. The prompt may be a statement in the command line such as "would you like to implement the recommendation (Y/N)?"

The AI neural network model 108 of the TDHB 104 may be further trained via machine learning based on the implemented automated code corrections. Additionally or alternatively, reinforcement learning through additional labeled data sets may increase the accuracy of the AI neural network model 108 in the generation of subsequent automated code recommendations. The data sets may be previous automated code recommendations. The data sets may be aggregated among the various users of a code repository 102. The data sets may be labeled by the manual acceptance and/or rejection of previous automated code recommendations by a developer. The data sets may also be labeled based on whether the automated code recommendations reduced the amount of technical debt in a codebase. It should be understood that although examples discussed herein refer to labeled data sets, other forms of reinforcement may be applied. For example, the new data sets may include costs, rewards, weights, biases, or other indicators to indicate to the AI neural network model 108 of the TDHB 104 that some portions of a dataset may be more favorable than others and to adjust the values of the hidden layers of the neural network accordingly.

The TDHB 104 may be configured to only generate the amount of automated code recommendations necessary to reduce the technical debt to an amount below the technical debt threshold. For example, if a software development team decides that 10 days of technical debt is an acceptable level of technical debt, the technical debt threshold may be set to 10 days. If the technical debt reaches 11 days upon the push of a new commit, the TDHB 104 may generate a number of automated code recommendations to bring the level of technical debt back down to approximately 10 days so as not to overload the repository by, for example, making overwhelming changes to the codebase simultaneously. When the automated code recommendations and are implemented as implemented automated code recommendations, the level of technical debt in the codebase may be re-determined based on the implemented automated code recommendations.

The TDHB 104 may also be invoked at the time of development. As a user is developing new computer program code for the software application, the TDHB 104 may detect a change to the computer program code and determine whether the user's changes contribute to increasing the level of technical debt. Determining whether the user's changes contribute to increasing the level of technical debt may be performed by the AI neural network model 108 that has already been trained to identify forms of code that increase the level of technical debt. When the user's changes have been determined to contribute to increasing the level of technical debt, the TDHB 104 may prevent a user from saving, implementing, committing, or other forms of finalizing a change in the codebase or in a code repository 102. The TDHB 104 may indicate to the user that the particular code that the user is attempting to include in the codebase contributes to the level of technical debt of the codebase. The TDHB 104 may also generate and prompt a user to implement an automated code recommendation to modify the user-generated code such that the new code does not contribute to increasing the level of technical debt of the codebase.

It should now be understood that disclosed herein are embodiments directed to methods and systems for reducing or eliminating technical debt. Embodiments may receive a level of technical debt of a codebase, determine whether the level of technical debt is greater than a technical debt threshold, and generate automated code recommendations using an AI neural network model when the level of technical debt is greater than the technical debt threshold.

The AI neural network model 108 as described in embodiments herein may be trained on predetermined coding rules, computer program code having zero technical debt, historical technical debt data, or combinations thereof. The AI neural network model may receive as input a user-generated computer program code and may generate as output a set of automated code recommendations. The AI neural network model may be further trained based on automated code recommendations that are approved by the user, do not contribute to the level of technical debt in the codebase, or combinations thereof.

Within the code repository 102, which may be a remote centralized storage environment of a codebase for collaborative work, the code analysis tools described herein may evaluate and track the overall technical debt of one or more portions of code of the codebase. The TDHB 104 as described herein may be configured to further determine and rank based on such tracking particular hotspots of the analyzed codebase (e.g., portions of the codebase that are incurring technical debt). The TDHB 104 may apply a technical debt threshold to the tracked technical debt, such as an acceptable amount of days present. If the level of technical debt is above the technical debt threshold, the TDHB 104 is configured to address the technical debt by, for example, evaluating the hotspots of the code incurring the technical debt and automatically generating a set of code corrections for the hotspots to address the associated technical debt. The TDHB 104 may be set to evaluate all hotspots or the hotspots of particular classes, packages, and/or modules. In embodiments, a developer may review each code correction and direct the TDHB 104 to implement particular code corrections. The developer may also give the TDHB 104 permission to automatically implement all code corrections. Once the TDHB 104 run is complete, the developer may push (i.e., upload) the code to the repository.

An AI component of the TDHB 104, such as the AI neural network model 108 described herein, may incorporate machine learning and can learn from portions of the code that do not incur significant portions of technical debt to determine what is considered proper form for code. The AI component may also be trained based on predetermined lists of coding best practices and historical data for complexity, refactoring, syntax, and the like. The AI component may also improve its future code corrections based on developer decisions to approve or reject prior TDHB code corrections as such historical data. Further, the AI component may be configured to automatically generate recommendations for coding to a developer, such as a type of coding that is prohibited or an alternative better practice recommendation, or may even automatically prevent a type of coding that may result in technical debt based on such historical data analysis.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

The invention claimed is:

1. An intelligent technical debt helper bot system, comprising:
   an artificial intelligence neural network model trained to identify forms of computer program code that contribute to increases in a level of technical debt; and
   a computing device comprising one or more processors and one or more memory components communicatively coupled to the one or more processors and the artificial intelligence neural network model, wherein the computing device is configured to:
   receive a first computer program code;
   receive a second computer program code comprising one or more changes of the first computer program code;
   determine, using the artificial intelligence neural network model, whether the one or more changes increase the level of technical debt above a technical debt threshold; and
   output an indication that the one or more changes exceed the technical debt threshold.

2. The intelligent technical debt helper bot system of claim 1, wherein the indication comprises code contributing to the increase in the level of technical debt above the technical debt threshold.

3. The intelligent technical debt helper bot system of claim 1, wherein output of the indication prevents one or more actions associated with the second computer program code comprising at least one of saving, implementing, committing, or finalizing the one or more changes.

4. The intelligent technical debt helper bot system of claim 1, wherein the one or more changes comprises a re-arrangement of code of the first computer program code, an addition to the first computer program code, removal of code from the first computer program code, or combinations thereof.

5. The intelligent technical debt helper bot system of claim 1, wherein the computing device is further configured to generate, using the artificial intelligence neural network model and based on the second computer program code, an automated code recommendation to address technical debt of the second computer program code in response to the indication that the one or more changes exceed the technical debt threshold, wherein the artificial intelligence neural network model is trained to generate the automated code recommendation learned from one or more sets of computer program code labeled with a corresponding technical debt.

6. The intelligent technical debt helper bot system of claim 5, wherein the computing device is further configured to:
   implement the automated code recommendation as an implemented automated code recommendation; and
   update the level of technical debt based on the implemented automated code recommendation.

7. The intelligent technical debt helper bot system of claim 5, wherein the computing device is further configured to implement the automated code recommendation.

8. The intelligent technical debt helper bot system of claim 1, wherein the artificial intelligence neural network model is trained on a set of predetermined coding rules, a set of computer program code having zero technical debt, historical technical debt data, or combinations thereof.

9. The intelligent technical debt helper bot system of claim 1, wherein the computing device is further configured to train the artificial intelligence neural network model using machine learning based on an automated code recommendation, acceptance or rejection of the automated code recommendation, or combinations thereof.

10. The intelligent technical debt helper bot system of claim 1, wherein the computing device is further configured to:
    determine that the one or more changes to the first computer program code is a user change;
    determine, using the artificial intelligence neural network model, whether the user change contributes to an increase of the level of technical debt; and
    prevent a user from implementing the user change when the user change contributes to increasing the level of technical debt.

11. An intelligent technical debt helper bot method, the method comprising:
    receiving, with a computing device comprising one or more processors and one or more memory components, a first computer program code;
    receiving, with the computing device, a second computer program code comprising one or more changes of the first computer program code;
    determining, using an artificial intelligence neural network model, whether the one or more changes increase a level of technical debt above a technical debt threshold, wherein the artificial intelligence neural network model is trained to identify forms of computer program code that contribute to increases in the level of technical debt; and
    outputting, with the computing device, an indication that the one or more changes exceed the technical debt threshold.

12. The intelligent technical debt helper bot method of claim 11, wherein the indication comprises code contributing to the increase in the level of technical debt above the technical debt threshold.

13. The intelligent technical debt helper bot method of claim 11, wherein outputting the indication prevents one or more actions associated with the second computer program code comprising at least one of saving, implementing, committing, or finalizing the one or more changes.

14. The intelligent technical debt helper bot method of claim 11, wherein the one or more changes comprises a re-arrangement of code of the first computer program code, an addition to the first computer program code, removal of code from the first computer program code, or combinations thereof.

15. The intelligent technical debt helper bot method of claim 11, further comprising generating, using the artificial intelligence neural network model and based on the second computer program code, an automated code recommendation to address technical debt of the second computer program code in response to the indication that the one or more changes exceed the technical debt threshold, wherein the artificial intelligence neural network model is trained to generate the automated code recommendation learned from one or more sets of computer program code labeled with a corresponding technical debt.

16. The intelligent technical debt helper bot method of claim 15, further comprising:
    implementing the automated code recommendation as an implemented automated code recommendation; and
    updating the level of technical debt based on the implemented automated code recommendation.

17. The intelligent technical debt helper bot method of claim 15, further comprising implementing the automated code recommendation.

18. The intelligent technical debt helper bot method of claim 11, wherein the artificial intelligence neural network model is trained on a set of predetermined coding rules, a set of computer program code having zero technical debt, historical technical debt data, or combinations thereof.

19. The intelligent technical debt helper bot method of claim 11, further comprising training the artificial intelligence neural network model using machine learning based on an automated code recommendation, acceptance or rejection of the automated code recommendation, or combinations thereof.

20. The intelligent technical debt helper bot method of claim 11, further comprising:
   determining that the one or more changes to the first computer program code is a user change;
   determining, using the artificial intelligence neural network model, whether the user change contributes to an increase of the level of technical debt; and
   preventing a user from implementing the user change when the user change contributes to increasing the level of technical debt.

\* \* \* \* \*